(12) United States Patent
Zhong et al.

(10) Patent No.: US 11,093,066 B2
(45) Date of Patent: Aug. 17, 2021

(54) TOUCH SUBSTRATE AND MANUFACTURING METHOD THEREOF, TOUCH DISPLAY PANEL AND TOUCH DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Tengfei Zhong, Beijing (CN); Xiaodong Xie, Beijing (CN); Min He, Beijing (CN); Xinxiu Zhang, Beijing (CN); Yuan Li, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/921,883

(22) Filed: Jul. 6, 2020

(65) Prior Publication Data

US 2021/0048906 A1 Feb. 18, 2021

(30) Foreign Application Priority Data

Aug. 13, 2019 (CN) .......................... 201910745651.6

(51) Int. Cl.
*G06F 3/041* (2006.01)
*G06F 3/044* (2006.01)
(52) U.S. Cl.
CPC .......... *G06F 3/0412* (2013.01); *G06F 3/0443* (2019.05); *G06F 3/0446* (2019.05); *G06F 3/04164* (2019.05); *G06F 2203/04103* (2013.01); *G06F 2203/04107* (2013.01); *G06F 2203/04111* (2013.01); *G06F 2203/04112* (2013.01)

(58) Field of Classification Search
CPC . G06F 2203/04103; G06F 2203/04107; G06F 2203/04111; G06F 2203/04112; G06F 3/0412; G06F 3/04164; G06F 3/0443; G06F 3/0446
USPC .................................................. 345/170–178
See application file for complete search history.

(56) References Cited

U.S. PATENT DOCUMENTS

| | | | | |
|---|---|---|---|---|
| 2010/0171718 | A1* | 7/2010 | Denda ................... | G06F 3/0445 345/173 |
| 2012/0320307 | A1* | 12/2012 | Aichi .................. | H01L 27/1446 349/61 |
| 2015/0309625 | A1* | 10/2015 | Huang .................. | G06F 3/0418 345/174 |

(Continued)

*Primary Examiner* — Tony O Davis
(74) *Attorney, Agent, or Firm* — Ling Wu; Stephen Yang; Ling and Yang Intellectual Property

(57) ABSTRACT

Touch substrate and manufacturing method thereof, touch display panel and touch display apparatus are provided. The touch substrate includes a base substrate, and a metal layer, an insulating layer and an electrode layer on the base substrate; the metal layer includes touch leads and an electrostatic conductive structure insulated from the touch leads, the electrostatic conductive structure being grounded; the electrode layer includes touch electrodes and dummy electrodes insulated from the touch electrodes, wherein the touch electrodes are electrically connected to the touch leads, and the dummy electrodes are electrically connected to the electrostatic conductive structure.

20 Claims, 6 Drawing Sheets

(56) References Cited

U.S. PATENT DOCUMENTS

| | | | |
|---|---|---|---|
| 2016/0364065 A1* | 12/2016 | Ding | G06F 3/0412 |
| 2017/0322652 A1* | 11/2017 | Ikeda | G02F 1/13338 |
| 2017/0371482 A1* | 12/2017 | Hashimoto | G02F 1/13338 |
| 2019/0012011 A1* | 1/2019 | Wang | G03F 7/0007 |
| 2019/0036073 A1* | 1/2019 | Yu | H01L 27/124 |
| 2019/0179445 A1* | 6/2019 | Moon | G06F 3/0412 |
| 2019/0302921 A1* | 10/2019 | Chen | G06F 3/044 |
| 2021/0013270 A1* | 1/2021 | Yu | H01L 51/5281 |

* cited by examiner

TOUCH SUBSTRATE AND MANUFACTURING METHOD THEREOF, TOUCH DISPLAY PANEL AND TOUCH DISPLAY APPARATUS

CROSS-REFERENCE TO RELATED APPLICATION

This application claims the priority of Chinese Patent Application No. 201910745651.6 filed to the CNIPA on Aug. 13, 2019, the entire content of which is hereby incorporated by reference.

TECHNICAL FIELD

The present disclosure relates to, but is not limited to, the field of touch technology, in particular to a touch substrate and a manufacturing method thereof, a touch display panel and a touch display apparatus.

BACKGROUND

Generally, a touch function is enabled in existing display apparatuses. For capacitive touch display apparatuses, it is usually necessary to manufacture touch electrodes. During the manufacturing of these touch electrodes, a whole layer of a conductive material is usually formed first, and then the conductive material is etched to form a plurality of separate touch electrodes. In fact, however, in order to improve the touch performance, there are some dissociate dummy electrodes in addition to the touch electrodes.

As electrostatic charges are prone to accumulate at the dummy electrodes during transportation of the display apparatuses, the electrostatic charges may damage the display panel locally, which affects the display effect, or even compromises the display apparatus.

SUMMARY

The following is a summary of the subject matter described in detail in the present disclosure. This summary is not intended to limit the protection scope of the claims.

The present disclosure provides a touch substrate, and the touch substrate includes a base substrate, a metal layer and an electrode layer on the base substrate, and an insulating layer between the metal layer and the electrode layer. The metal layer includes touch leads and an electrostatic conductive structure insulated from the touch leads, the electrostatic conductive structure being grounded. The electrode layer includes touch electrodes and dummy electrodes insulated from the touch electrodes, wherein the touch electrodes are electrically connected to the touch leads, and the dummy electrodes are electrically connected to the electrostatic conductive structure.

In an exemplary embodiment, the electrostatic conductive structure is a metal mesh.

In an exemplary embodiment, the metal mesh includes a plurality of first metal wires extending along a first direction and a plurality of second metal wires extending along a second direction, and the angles between the first metal wires and the second metal wires are 70°-80°. The distance between any two adjacent first metal wires is 100-300 microns, and the distance between any two adjacent second metal wires is 100-300 microns.

In an exemplary embodiment, the touch substrate includes pixel regions and pixel defining regions between the pixel regions. The electrostatic conductive structure is a plurality of metal wires in the pixel defining regions.

In an exemplary embodiment, the touch substrate further includes first vias and second vias extending through the insulating layer. The touch electrodes are connected to the touch leads through the first vias, and the dummy electrodes are connected to the electrostatic conductive structure through the second vias.

In an exemplary embodiment, the orthographic projection of the first vias on the base substrate is located on the orthographic projection of the corresponding touch leads on the base substrate, and the orthographic projection of the second vias on the base substrate is located on the orthographic projection of the corresponding electrostatic conductive structure on the base substrate.

In an exemplary embodiment, the touch leads include first touch leads and second touch leads. The touch electrodes include driving electrodes extending along a third direction and sensing electrodes extending along a fourth direction, wherein the driving electrodes are electrically connected to the first touch leads and the sensing electrodes are electrically connected to the second touch leads. The dummy electrodes are located in areas surrounded by the adjacent driving electrodes and the adjacent sensing electrodes.

In an exemplary embodiment, the third direction intersects with the first direction and the second direction respectively, and the fourth direction intersects with the first direction, the second direction and the third direction respectively.

In an exemplary embodiment, the touch substrate further includes: a plurality of bridging portions and third vias extending through the insulating layer; wherein the driving electrodes include a plurality of driving sub-electrodes, and the adjacent driving sub-electrodes are connected to both ends of the bridging portions through the third vias so as to make the adjacent driving sub-electrodes electrically connect to each other; and/or the sensing electrodes include a plurality of sensing sub-electrodes, and the adjacent sensing sub-electrodes are connected to both ends of the bridging portions through the third vias respectively, so as to make the adjacent sensing sub-electrodes electrically connect to each other.

In an exemplary embodiment, the plurality of bridging portions are arranged in the same layer as the metal layer and insulated from the metal layer. The material of the bridging portions is the same as that of the electrode layer, or the material of the bridging portions is the same as that of the metal layer.

In an exemplary embodiment, the touch substrate further includes: a protective layer located on one side, away from the base substrate, of the metal layer and the electrode layer.

In an exemplary embodiment, the touch leads and the electrostatic conductive structure are formed on the same layer, and the electrostatic conductive structure is made of the same material as the touch leads.

In an exemplary embodiment, the material of the electrode layer includes at least one of indium tin oxide and zinc aluminum oxide.

The present disclosure also provides a touch display panel including any of the above touch substrates.

In an exemplary embodiment, the touch display panel further includes: a cover plate and a display component, wherein the cover plate is reused as the base substrate of the touch substrate, and the metal layer and the electrode layer are located on one side, close to the display component, of the cover plate; or a color film substrate including a first base substrate and color-resist units on one surface of the first base substrate, wherein the first base substrate is reused as the base substrate of the touch substrate; or an array substrate including a second base substrate and thin film transistors on one surface of the second base substrate, wherein the second base substrate is reused as the base substrate of the touch substrate, and the metal layer and the electrode layer are located on one side, away from the second base substrate, of the thin film transistors.

The present disclosure also provides a touch display apparatus including any of the above touch display panels.

The present disclosure also provides a manufacturing method of a touch substrate, including: providing a base substrate; manufacturing a metal layer, an insulating layer and an electrode layer on the base substrate; wherein, the metal layer includes touch leads and an electrostatic conductive structure insulated from the touch leads, the electrostatic conductive structure being grounded; the electrode layer includes touch electrodes and dummy electrodes insulated from the touch electrodes, wherein the touch electrodes are electrically connected to the touch leads; the dummy electrodes are electrically connected to the electrostatic conductive structure.

In an exemplary embodiment, the act of manufacturing the metal layer, the insulating layer and the electrode layer on the base substrate includes: forming a metal film on the substrate, and patterning the metal film to obtain the metal layer; depositing an insulating layer on the metal layer, and patterning the insulating layer to form first vias and second vias extending through the insulating layer; forming a conductive film on the insulating layer, and patterning the conductive film to obtain the electrode layer; wherein, the touch electrodes are connected to the touch leads through the first vias, and the dummy electrodes are connected to the electrostatic conductive structure through the second vias.

In an exemplary embodiment, the act of manufacturing the metal layer, the insulating layer and the electrode layer on the base substrate includes: forming a conductive film on the base substrate, and patterning the conductive film to obtain the electrode layer; depositing an insulating layer on the electrode layer, and patterning the insulating layer to form first vias and second vias extending through the insulating layer; forming a metal film on the insulating layer, and patterning the metal film to obtain the metal layer; wherein, the touch electrodes are connected to the touch leads through the first vias, and the dummy electrodes are connected to the electrostatic conductive structure through the second vias.

In an exemplary embodiment, the manufacturing method further includes: manufacturing a protective layer on one side, away from the base substrate, of the metal layer and the electrode layer.

Other aspects will become apparent upon reading and understanding the drawings and detailed description.

Additional aspects and advantages of the present disclosure will be set forth in part in the following description, and will be apparent from the description, or may be learned through practice of the present disclosure. Purposes and advantages of the present disclosure may be realized and acquired by structures specified in the specification, claims and drawings.

BRIEF DESCRIPTION OF DRAWINGS

The above and/or additional aspects and advantages of the present disclosure will become apparent and easily understood from the following description of embodiments with reference to the accompanying drawings, in which.

FIGURE LEGEND

Figure 1:
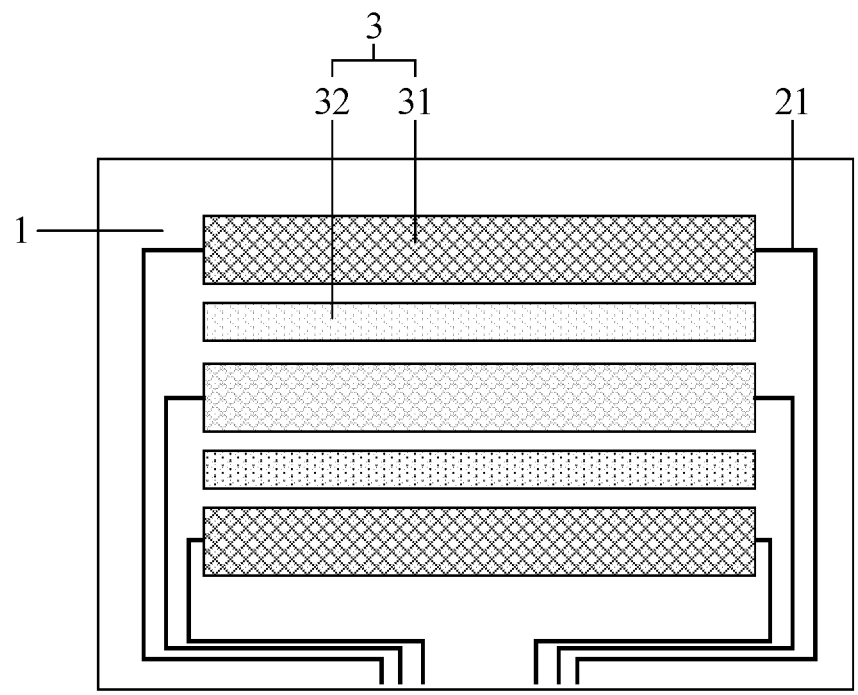
FIG. 1 is a schematic structural diagram of a touch substrate.

1—base substrate;
2—metal layer; 21—touch lead; 211—first touch lead; 212—second touch lead; 22—electrostatic conductive structure; 22a—metal mesh; 221a—first metal wire; 222a—second metal wire; 22b—metal wire; 23—ground wire;
3—electrode layer; 31—touch electrode; 311—driving electrode; 3111—touch sub-electrode; 312—sensing electrode; 32—dummy electrode;
4—insulating layer; 41—first via; 42—second via; 43—third via;
5—bridging portion;
6—protective layer;
A—active Area; B—non-active area; P—pixel region; N—pixel defining region; G—cover plate; X—display component; F—first base substrate; C—color-resist unit; S—second base substrate; T—thin film transistor.

DETAILED DESCRIPTION

The following will clearly and completely describe the technical solution of the embodiments of the present invention with reference to the drawings of the embodiments of the disclosure of the present invention. The thickness and shape of each film layer in the drawings are not drawn to actual scale, and the purpose is only to schematically illustrate the disclosure of the present invention. The described embodiments are apparently part of the embodiments of the disclosure of the present invention, rather than all of the embodiments. Based on the described embodiments of the disclosure of the present invention, all other embodiments obtained by those of ordinary skills in the art without creative efforts are covered by the protection scope of the disclosure of the present invention. It should be understood that the embodiments described below are merely intended to illustrate and explain the present disclosure, and are not intended to limit the present disclosure. In addition, embodiments in the present disclosure and features in the embodiments may be combined with each other without conflict.

Examples of the embodiments are illustrated in the drawings, wherein same or similar reference numbers refer to same or similar components or components having same or similar functions throughout the drawings. In addition, if a detailed description of known arts is unnecessary when illustrating the features of the present disclosure, such detailed description is omitted. The embodiments described below with reference to the drawings are exemplary, and are merely intended to explain the present disclosure, and cannot be interpreted as limiting the present disclosure.

It will be understood by those skilled in the art that unless otherwise defined, all terms (including technical terms and scientific terms) used herein have the same meanings as those generally understood by those skilled in the art to which the present disclosure pertains. It should also be understood that terms such as those defined in a general dictionary should be construed to have meanings consistent with those in the context of the prior arts, and will not be interpreted in idealized or overly formal meanings unless specifically defined herein.

It will be understood by those skilled in the art, the singular forms "a", "an", "said" and "the" used herein may also include plural forms unless expressly stated. It should be further understood that the phase "including" used in the specification of the present disclosure means the presence of stated features, integers, acts, operations, elements and/or components, but does not exclude the presence or addition of one or more other features, integers, acts, operations, elements, components and/or groups thereof. It should be understood that when stating that an element is "connected" or "coupled" to another element, such element may be directly connected or coupled to other elements, or there may be intermediate elements. In addition, "connected" or "coupled" used herein may include wireless connection or wireless coupling. The phrase "and/or" as used herein includes all or any unit of and all combinations of one or more associated items listed herein.

For the capacitive touch substrate, taking the touch substrate shown in FIG. 1 as an example, when the electrode layer is manufactured, a whole layer of conductive material is usually formed first, and then the whole layer of conductive material is etched to form a plurality of separate touch electrodes 31. In this process, after the whole layer of conductive material is etched, not only the touch electrodes 31 but also some dissociate dummy electrodes 32 are formed.

These dummy electrodes 32 are able to improve the performance of the touch substrate to some extent. However, during the transportation of the touch substrate and the display apparatus, electrostatic charges are prone to accumulate on these dummy electrodes 32. As a result, the display panel may be damaged by the local electrostatic charges, which affects the display effect of the damaged area, or even completely damages the display panel.

Hereinafter, the technical solution of the present disclosure will be described in detail with exemplary examples/embodiments.

Figure 2:
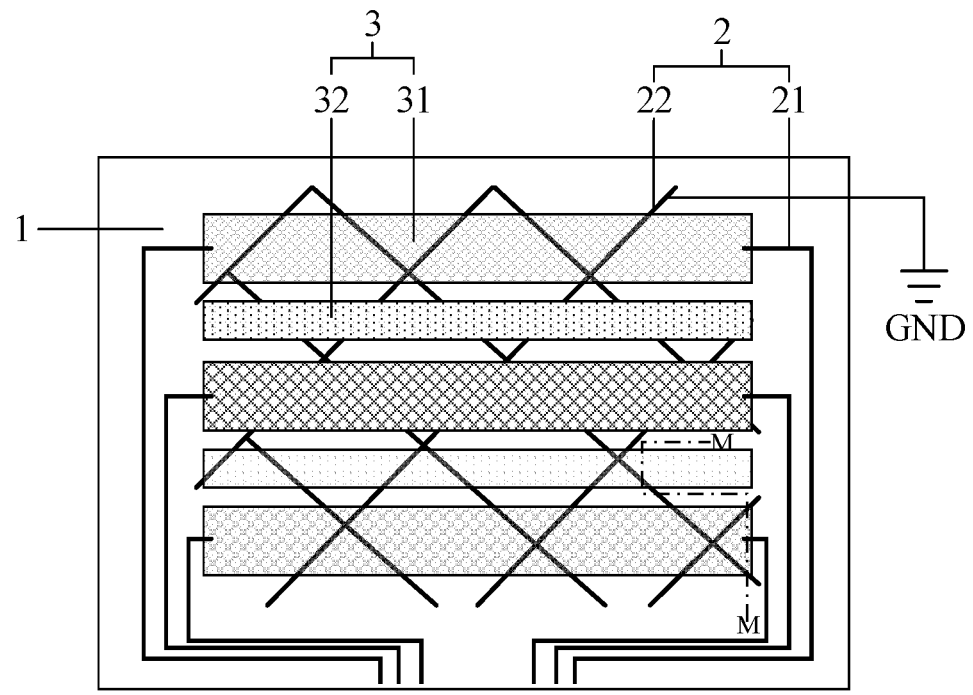
FIG. 2 is a schematic structural diagram of a touch substrate according to an embodiment of the present disclosure.
Figure 3:
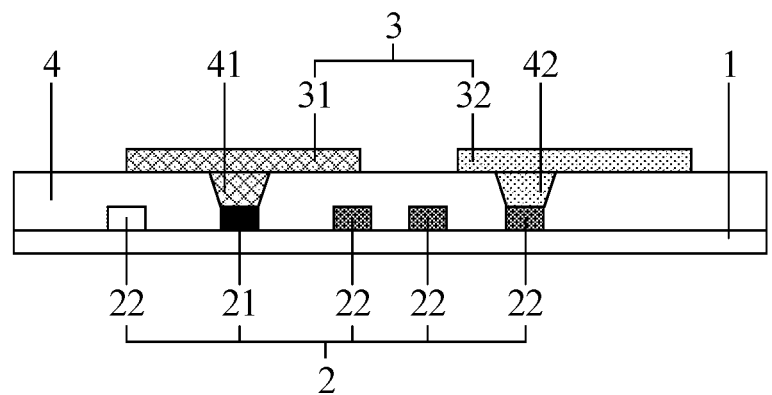
FIG. 3 is a schematic cross-sectional view along the M-M line in FIG. 2.

Embodiments of the present disclosure provide a touch substrate, as shown in FIGS. 2 and 3, including a base substrate 1, a metal layer 2 and an electrode layer 3 on the base substrate 1, and an insulating layer 4 between the metal layer 2 and the electrode layer 3; a touch lead 21 of the metal layer 2 and an electrostatic conductive structure 22 insulated from the touch lead 21, the electrostatic conductive structure 22 being grounded; the electrode layer 3 includes a touch electrode 31 and a dummy electrode 32 insulated from the touch electrode 31, and the touch electrode 31 is electrically connected to the touch lead 21; the dummy electrode 32 is electrically connected to the electrostatic conductive structure 22.

In the touch substrate provided by the embodiment of the present disclosure, the dummy electrode 32 is electrically connected to the grounded electrostatic conductive structure 22, so that electrostatic charges on the dummy electrode 32 may be discharged through the electrostatic conductive structure 22, thereby effectively preventing electrostatic charges from accumulating on the dummy electrode 32, and further avoiding the problem of local electrostatic charge damage of the display panel caused by the electrostatic charges accumulated on the dummy electrode 32. As the touch lead 21 and the electrostatic conductive structure 22 are formed on the same layer, the thickness of the touch substrate may be reduced. In addition, the electrostatic conductive structure and the touch leads may be made of the same material, thus saving a process of thin film deposition.

As the touch substrate is commonly used in display apparatuses to realize a touch operation on the display apparatuses, touch substrates are not able to affect the display of display apparatuses. In an exemplary embodiment, the material of the electrode layer 3 includes at least one of indium tin oxide and zinc aluminum oxide. Indium tin oxide and zinc aluminum oxide are transparent conductive materials, which may enable the detection of touch, without affecting the display of the display apparatus.

As shown in FIG. 3, optionally, the touch substrate further includes a first via 41 and a second via 42 extending through the insulating layer 4; the touch electrode 31 is connected to the touch lead 21 through the first via 41, and the dummy electrode 32 is connected to the electrostatic conductive structure 22 through the second via 42.

In an exemplary embodiment, the first via 41 and the second via 42 may be formed by patterning the insulating layer 4, and the insulating layer 4 not only functions as interlayer insulation between the metal layer 2 and the electrode layer 3, but also functions as intralayer insulation within the metal layer 2.

Referring to FIGS. 2 and 3, in order to achieve the electrical connection between the touch electrode 31 and the touch lead 21, and between the dummy electrode 32 and the electrostatic conductive structure 22, the orthographic projection of the first via 41 on the base substrate 1 is located on the orthographic projection of the corresponding touch lead 21 on the base substrate 1, and the orthographic projection of the second via 42 on the base substrate 1 is located on the orthographic projection of the corresponding electrostatic conductive structure 22 on the base substrate 1.

In the touch substrate shown in FIG. 3, the electrode layer 3 is located on one side, away from the base substrate 1, of the metal layer 2. In the following embodiments, the drawings provided also take "the electrode layer 3 is located on one side, away from the base substrate 1, of the metal layer 2" as an example. However, in fact, for the present disclosure, "the metal layer 2 is located on one side, away from the base substrate 1, of the electrode layer 3" and "the electrode layer 3 is located on one side, away from the base substrate 1, of the metal layer 2" are the same in principle and resulting effect. By way of merely simplifying the illustration, the detailed explanation will be made by taking "the electrode layer 3 is located on one side, away from the base substrate 1, of the metal layer 2" as an example.

Figure 4:
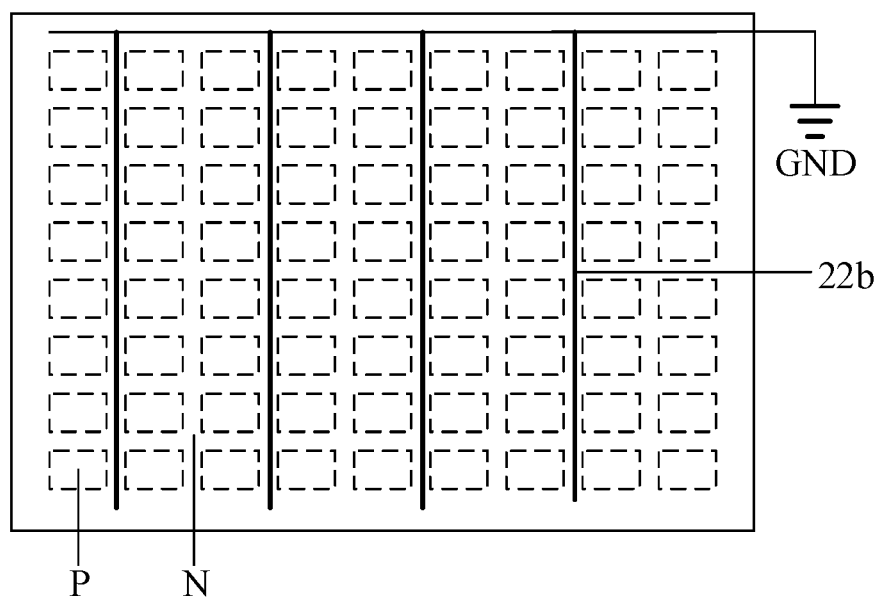
FIG. 4 is a schematic plan view of an electrostatic conductive structure according to an embodiment of the present disclosure.

As shown in FIG. 4, the touch substrate includes a plurality of pixel regions P and pixel defining regions N between the pixel regions P, and the electrostatic conductive structure is a plurality of metal wires 22b in the pixel defining regions N.

According to embodiments of the present disclosure, the metal wires arranged in the pixel defining regions N are used as an electrostatic conductive structure, so that the electrostatic charges on the electrostatic dummy electrodes may be discharges without affecting the display.

In an exemplary embodiment, the pixel regions P on the touch substrate are regions corresponding to the pixel regions in the display substrate, and the pixel defining regions N are regions corresponding to the pixel defining regions in the display substrate.

Figure 5:
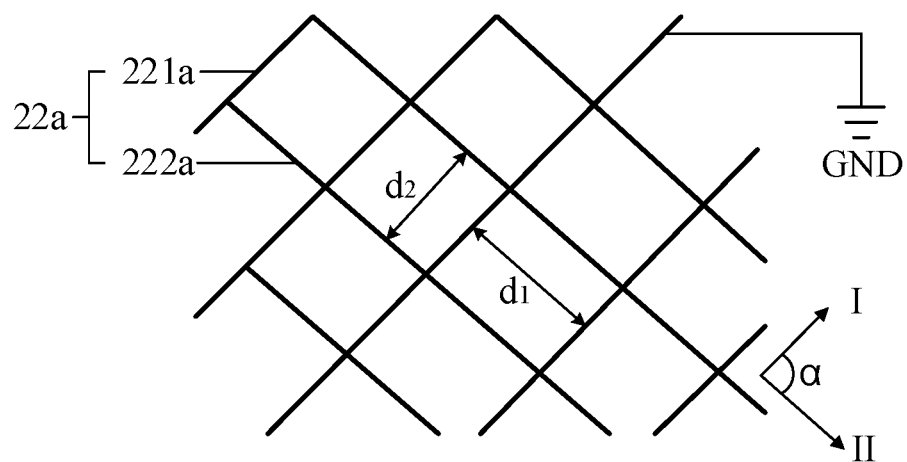
FIG. 5 is a schematic plan view of another electrostatic conductive structure according to an embodiment of the present disclosure.

As shown in FIG. 5, in an exemplary embodiment, the electrostatic conductive structure 22 is a metal mesh 22a. Also referring to FIG. 2, since the metal mesh 22a may be distributed over the whole surface of the touch substrate, rather than just over the pixel defining regions, there are more overlapping regions between the orthographic projection of the metal mesh 22a on the base substrate 1 and the orthographic projections of various dummy electrodes 32 on the base substrate 1. Therefore, without affecting the display effect, a dummy electrode may be connected to the metal mesh 22a through a plurality of vias, which is beneficial to conducting the electrostatic charges on the dummy electrode 32 to the metal mesh 22a in time, and the mesh-like structure of the metal mesh 22a may also help discharge the electrostatic charges in time. As a result, when the electrostatic conductive structure 22 is in the metal mesh 22a, the electrostatic charges on the dummy electrode 32 may be effectively and timely discharged.

In order to avoid the influence of the metal mesh 22a on the display effect, the parameters of the metal mesh 22a may be set to secure the display effect. In an exemplary embodiment, the metal mesh 22a includes a plurality of first metal wires 221a extending along the first direction I and a plurality of second metal wires 222a extending along the second direction II. The angle between the first metal wires 221a and the second metal wires 222a is 70°-80°. The distance d1 between any two adjacent first metal wires 221a is 100-300 microns, and the distance d2 between any two adjacent second metal wires 222a is 100-300 microns.

In an exemplary embodiment, the distance d1 between any two adjacent first metal wires 221a is 200 microns, and the distance d2 between any two adjacent second metal wires 222a is 200 microns.

Figure 6:
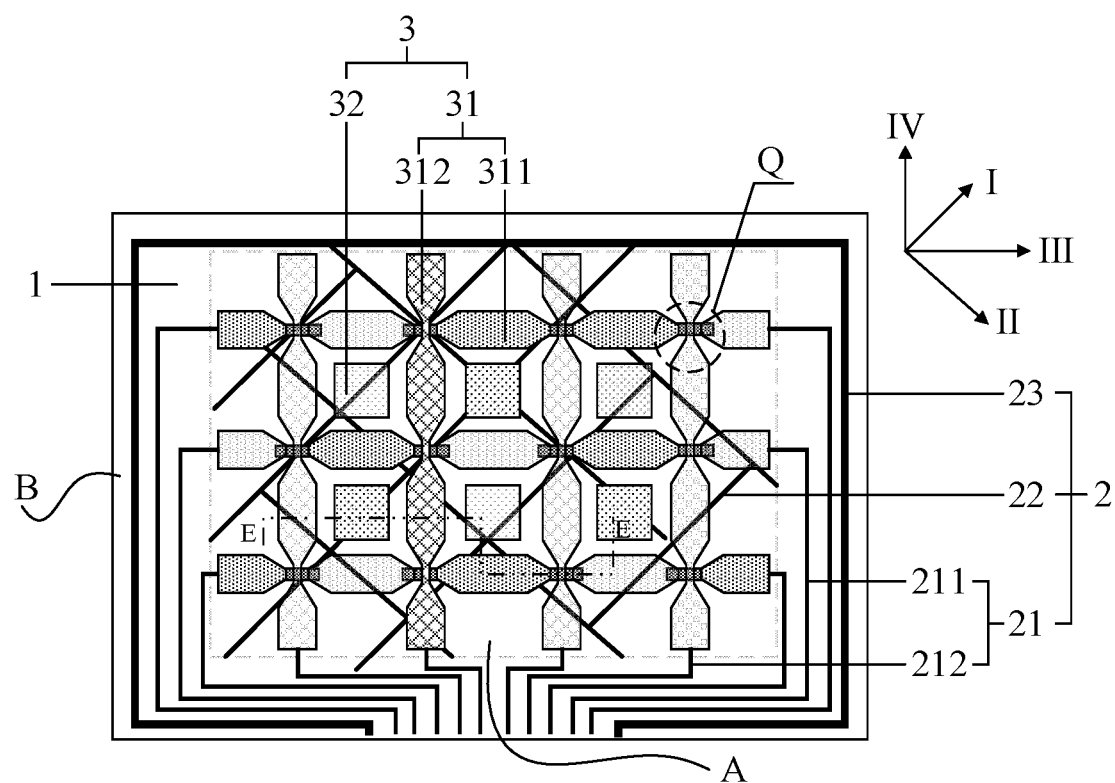
FIG. 6 is a schematic structural diagram of a mutual capacitance touch substrate according to an embodiment of the present disclosure.

In order to realize multi-touch, the touch substrate is a mutual capacitance touch substrate. In an exemplary embodiment, a touch substrate in which touch electrodes and sensing electrodes are located on the same electrode layer is provided. As shown in FIG. 6, in the touch substrate according to the embodiment of the present disclosure, the touch leads 21 include a first touch lead 211 and a second touch lead 212; the touch electrodes 31 include a driving electrode 311 extending along the third direction III and a sensing electrode 312 extending along the fourth direction IV. The driving electrode 311 is electrically connected to the first touch lead 211 and the sensing electrode 312 is electrically connected to the second touch lead 212. The dummy electrodes 32 are located in the areas surrounded by the adjacent driving electrodes 311 and the adjacent sensing electrodes 312.

In an exemplary embodiment, the third direction III intersects with the first direction I and the second direction II respectively, and the fourth direction IV intersects with the first direction I, the second direction II and the third direction III respectively.

The embodiment of the present disclosure provides a positional relationship between the dummy electrode 32 and the touch electrode 31 of an exemplary mutual capacitance touch substrate. As the driving electrode 311 and the sensing electrode 312 are arranged in the same electrode layer 3, it is necessary to form the driving electrode 311 extending along the third direction III and the sensing electrode 312 extending along the fourth direction IV. Therefore, at the time of etching to form the driving electrode 311 and sensing electrode 312, dummy electrodes are formed in the areas surrounded by the adjacent driving electrodes 311 and the adjacent sensing electrodes 312. The dummy electrodes 32 may not only able to improve the shadow elimination problem of the touch substrate to some extent, but also reduce the etching area and the power consumption of etching the electrode layer.

In an exemplary embodiment, the touch substrate includes an active area A and a non-active area B, and the metal layer 2 further includes a ground wire 23. The electrostatic conductive structure 22 is grounded by connecting to the ground wire 23. In an exemplary embodiment, the ground wire 23 is located on one side, away from the active area A, of the touch leads 21, and the ground wire 23 is grounded. Also referring to FIG. 4, in the case that the electrostatic conductive structure 22 is a metal mesh 22a, at least one point in the metal mesh 22a is connected to the ground wire 23. Also referring to FIG. 5, in the case that the electrostatic conductive structure 22 is a metal wire 22b, each of the metal wires 22b is connected to the ground wire 23.

For a mutual-capacitance touch substrate, the driving electrode 311 and the sensing electrode 312 are required to intersect with (insulate from) each other, and a capacitor is formed at the intersection of the driving electrode 311 and the sensing electrode 312. When one's finger touches the touch substrate, it affects the coupling between the driving electrode 311 and the sensing electrode 312 near the touch point, thus changing the capacitance between the two electrodes. The capacitance may be detected and used as the basis for determining the coordinates of the touch point.

Figure 7:
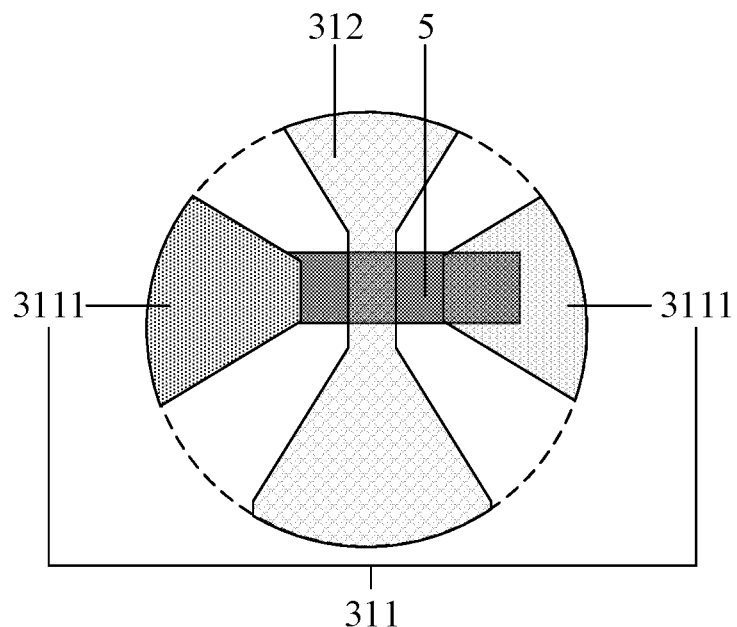
FIG. 7 is an enlarged schematic diagram of the region Q in FIG. 6.
Figure 8:
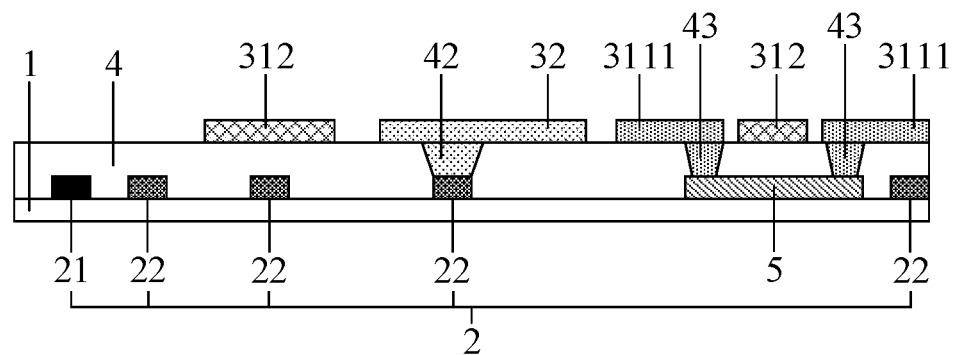
FIG. 8 is a schematic cross-sectional view along the E-E line in FIG. 6.

As shown in FIG. 7 and FIG. 8, in an exemplary embodiment, a touch substrate is provided, which further includes: a plurality of bridging portions 5 and third vias 43 extending through the insulating layer 4. The driving electrode 311 includes a plurality of driving sub-electrodes 3111, and the adjacent driving sub-electrodes 3111 are connected to both ends of the bridging portions 5 through the third vias 43 so as to make the adjacent driving sub-electrodes 3111 electrically connect to each other.

In an exemplary embodiment, the sensing electrode 312 may include a plurality of sensing sub-electrodes, and the adjacent sensing sub-electrodes are respectively connected to both ends of the bridging portions 5 through the third vias 43, so as to make the adjacent sensing sub-electrodes electrically connect to each other.

According to the embodiment of the present disclosure, the driving electrodes or the sensing electrodes are divided into a plurality of sub-electrodes, and these sub-electrodes are connected to each other by utilizing bridging portions and vias, so that the driving electrodes and the sensing electrodes may be manufactured on the same electrode layer, thus saving acts of the manufacturing process and reducing the production cost.

Figure 9:
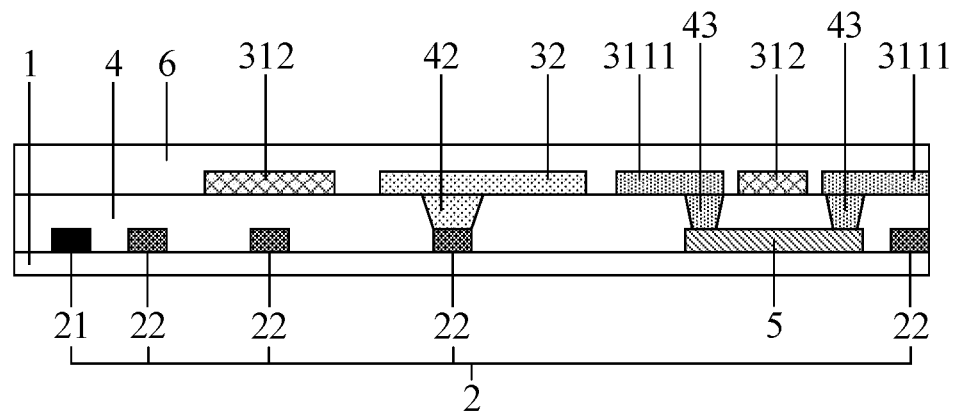
FIG. 9 is a schematic cross-sectional diagram of a touch substrate according to an embodiment of the present disclosure.

As shown in FIG. 9, in an exemplary embodiment, a plurality of bridging portions 5 are arranged in the same layer as the metal layer 2 and insulated from the metal layer 2. In some exemplary embodiments, the material of the bridging portions 5 is the same as that of the electrode layer 3. In an exemplary embodiment, during the manufacture process, the bridging portions 5 may be manufactured after the metal layer 2 is manufactured. Since the bridging portion 5 is made of the same material as the electrode layer 3, it is beneficial to reducing the moire effect of the display apparatus.

In yet some exemplary embodiments, the material of the bridging portions 5 is the same as that of the metal layer 2. In an exemplary embodiment, during the manufacture process, the bridging portion 5 and the metal layer 2 may be manufactured at the same time. When designing a mask plate, care should be taken to ensure the insulation between the bridging portions 5 and the metal mesh 22. Since the bridging portion 5 and the metal layer 2 may be manufactured at the same time, it is beneficial to saving acts of the process and reducing the production cost.

As shown in FIG. 9, in an exemplary embodiment, the touch substrate further includes a protective layer 6 on one side, away from the base substrate 1, of the metal layer 2 and the electrode layer 3. The protective layer 6 functions to protect the metal layer 2 and the electrode layer 3. In an exemplary embodiment, the protective layer 6 may be made of silicon oxynitride (SiNO) material.

Based on the same inventive concept, an embodiment of the present disclosure provides a touch display panel, and the touch display panel includes any one of the touch substrates in the above embodiments and is able to achieve the beneficial effects of the corresponding touch substrates, and will not be described in detail herein.

The metal layer and the electrode layer for enabling the touch function may be fabricated at different positions of the touch display panel, which will be described in detail below.

Figure 10:
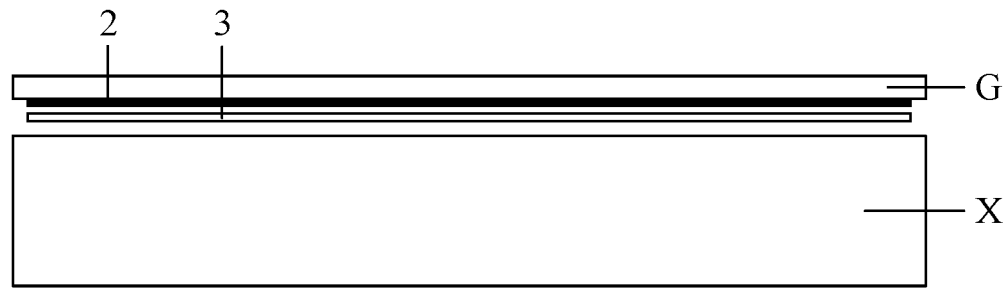
FIG. 10 is a schematic cross-sectional diagram of a touch display substrate according to an embodiment of the present disclosure.

In some exemplary embodiments, as shown in FIG. 10, the touch display panel includes a cover plate G and a display component X. In the case that the display panel is a liquid crystal display panel, the display component X generally includes an array substrate, a color film substrate, a liquid crystal layer, a polarizer, and the like. In the case that the display panel is a liquid crystal display panel, the display component includes an array substrate, an organic light emitting display device, a polarizer, and the like. In an embodiment of the present disclosure, the cover plate G is reused as a base substrate of the touch substrate, and the metal layer 2 and the electrode layer 3 are located on one side, near the display component X, of the cover plate G.

In the touch display panel according to the embodiment of the present disclosure, the metal layer 2 and the electrode layer 3 for enabling the touch function are fabricated on the inner side of the cover plate G, which is an OGS (One Glass Solution) touch display panel, thus saving one layer of the base substrate and reducing the thickness of the touch display panel.

Figure 11:
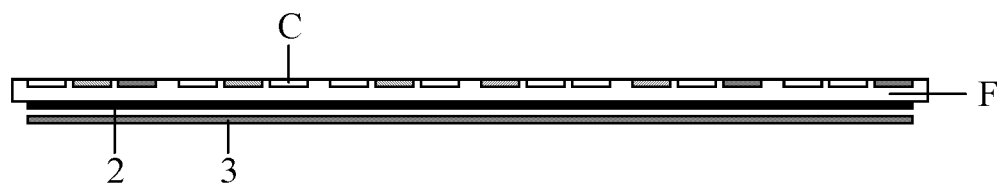
FIG. 11 is a schematic cross-sectional diagram of another touch display substrate according to an embodiment of the present disclosure.

In another exemplary embodiment, as shown in FIG. 11, the touch display panel includes: a color film substrate including a first base substrate F and color-resist units C on one surface of the first base substrate F, wherein the first base substrate F is reused as a base substrate of the touch substrate. Although in the touch display panel shown in FIG. 11, the metal layer 2 and the electrode layer 3 are located on one side, away from the color-resist units C, of the first base substrate F, in fact, in another embodiment, the metal layer 2 and the electrode layer 3 may be located on one side, away from the first base substrate F, of the color-resist units C. In the touch display panel according to the embodiment of the present disclosure, the metal layer 2 and the electrode layer 3 for enabling the touch function are fabricated on the base substrate of the color film substrate, thus saving one layer of the base substrate and reducing the thickness of the touch display panel.

Figure 12:
FIG. 12 is a schematic cross-sectional diagram of yet another touch display substrate according to an embodiment of the present disclosure.

In yet some exemplary embodiments, as shown in FIG. 12, the touch display panel includes: an array substrate including a second base substrate S and thin film transistors T on one surface of the second base substrate S, wherein the second base substrate S is reused as a base substrate of the touch display panel, and the metal layer 2 and the electrode layer 3 are located on one side, away from the second base substrate S, of the thin film transistors T. In the touch display panel according to the embodiment of the present disclosure, the metal layer 2 and the electrode layer 3 for enabling the touch function are fabricated on the base substrate of the color film substrate, thus saving one layer of the base substrate and reducing the thickness of the touch display panel.

Based on the same inventive concept, an embodiment of the present disclosure provides a touch display apparatus, and the touch display apparatus includes any one of the touch display panels in the above embodiments and are able to achieve the beneficial effects of the corresponding touch display panels, and will not be described in detail herein.

Figure 13:
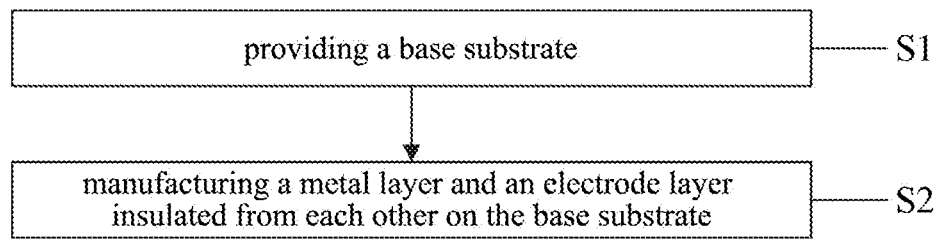
FIG. 13 is a flowchart of a manufacturing method of a touch substrate in an embodiment of the present disclosure.

Based on the same inventive concept, an embodiment of the present disclosure provides a manufacturing method of a touch substrate. As shown in FIG. 13, the manufacturing method includes S1 and S2.

S1: providing a base substrate. The base substrate may be a separate base substrate, or a base substrate in which the cover plate in the display panel is reused as a touch substrate, or a base substrate in which the base substrate of the color film substrate is reused as a touch substrate, or a base substrate in which the base substrate of the array substrate is reused as a touch substrate.

S2: manufacturing a metal layer, an insulating layer and an electrode layer on the base substrate; wherein, the metal layer includes touch leads and an electrostatic conductive structure insulated from the touch leads, the electrostatic conductive structure being grounded; the electrode layer includes touch electrodes and dummy electrodes insulated from the touch electrodes, wherein the touch electrodes are electrically connected to the touch leads, and the dummy electrodes are electrically connected to the electrostatic conductive structure.

In the manufacturing method of the touch substrate according to the embodiment of the present disclosure, when the metal layer is manufactured, in addition to the touch leads, the grounded electrostatic conductive structure is also formed. The dummy electrodes are electrically connected to a metal mesh, so that electrostatic charges on the dummy electrodes may be discharged through the electrostatic conductive structure, thereby effectively preventing the electrostatic charges from accumulating on the dummy electrodes, and further avoiding the problem of local electrostatic damage of the display panel caused by the electrostatic charges accumulated on the dummy electrodes. Meanwhile, as the touch leads and the electrostatic conductive structure are formed on the same layer, the thickness of the touch substrate may be reduced, and the problem of electrostatic charges accumulation on the dummy electrodes may be solved without increasing acts of the process.

Figure 14:
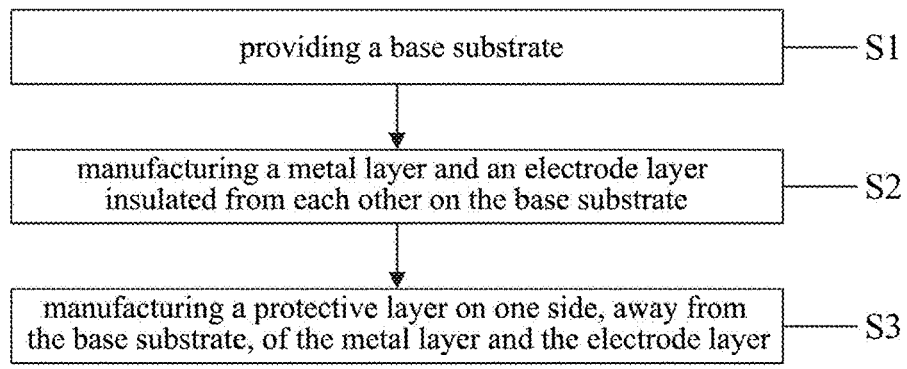
FIG. 14 is a flowchart of another manufacturing method of a touch substrate in an embodiment of the present disclosure.

As shown in FIG. 14, in an exemplary embodiment, the provided manufacturing method of the touch substrate further includes S3.

S3: manufacturing a protective layer on one side, away from the base substrate, of the metal layer and the electrode layer. The protective layer functions to protect the metal layer and the electrode layer. In an exemplary embodiment, the protective layer may be formed by manufacturing a silicon oxynitride (SiNO) layer on the side of the metal layer and the electrode layer away from the base substrate.

In the manufacturing method of the touch substrate according to the embodiment of the present disclosure, the metal layer may be manufactured on the base substrate before the electrode layer is manufactured, or the electrode layer may be manufactured before the metal layer is manufactured, which will be described in detail below.

Figure 15:
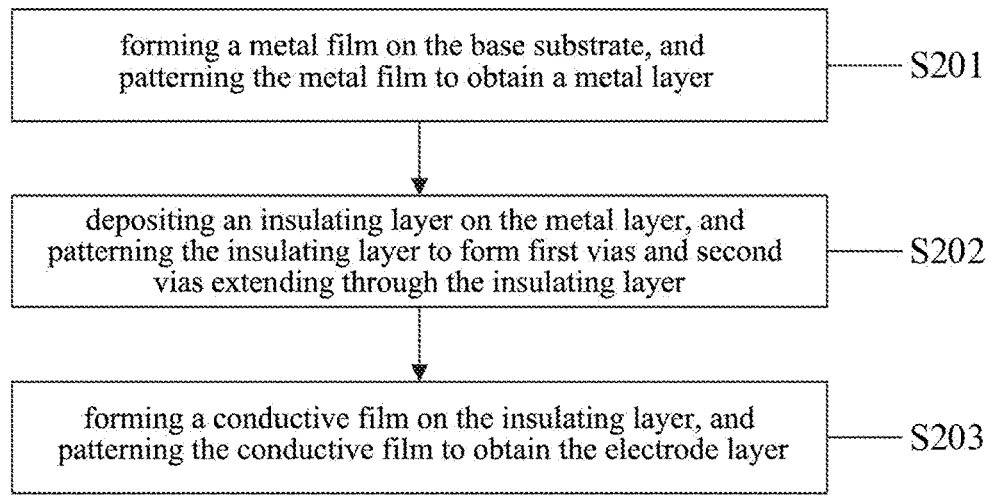
FIG. 15 is a flowchart of act S2 in a manufacturing method of a touch substrate in an embodiment of the present disclosure.

As shown in FIG. 15, in an exemplary embodiment, in the provided manufacturing method of the touch substrate, act S2 includes S201-S203.

S201: forming a metal film on the base substrate, and patterning the metal film to obtain a metal layer. The metal layer includes touch leads and an electrostatic conductive structure insulated from the touch leads, the electrostatic conductive structure being grounded.

S202: depositing an insulating layer on the metal layer, and patterning the insulating layer to form first vias and second vias extending through the insulating layer.

S203: forming a conductive film on the insulating layer, and patterning the conductive film to obtain the electrode layer. The electrode layer includes touch electrodes and dummy electrodes insulated from the touch electrodes, wherein the touch electrodes are electrically connected to the touch leads through first vias, and the dummy electrodes are electrically connected to the electrostatic conductive structure through second vias.

In the manufacturing method of the touch substrate according to the embodiment of the present disclosure, when the metal layer is manufactured, the electrical connection between the touch leads and the electrostatic conductive structure may be formed at the same time, and the electrical connection between the touch leads and the touch electrode, and the electrical connection between the metal mesh and the dummy electrode may be achieved by utilizing the vias, so that the problem of local electrostatic damage of the display panel caused by the electrostatic charges accumulated on the dummy electrode may be solved, without increasing acts of the process.

Figure 16:
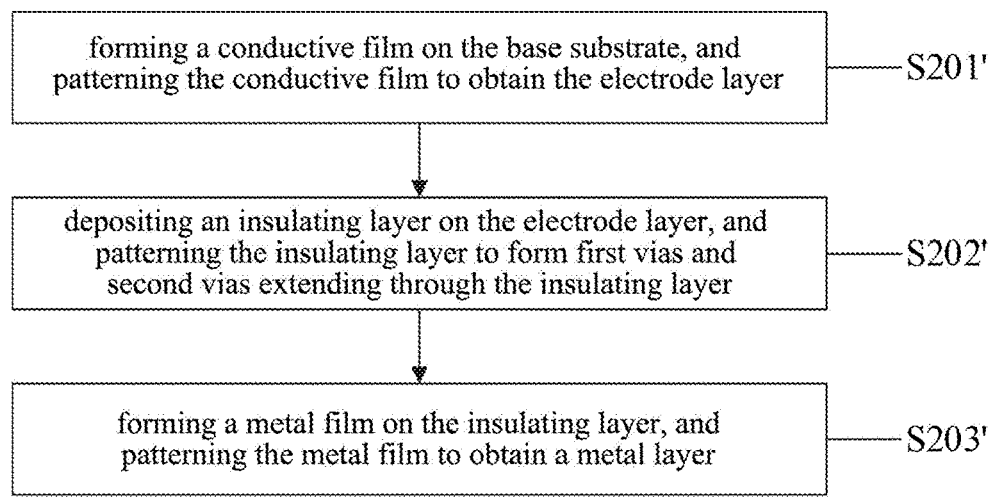
FIG. 16 is an alternative flowchart of act S2 in a manufacturing method of a touch substrate in an embodiment of the present disclosure.

As shown in FIG. 16, in the manufacturing method of the touch substrate provided in an exemplary embodiment, act S2 includes S201'-S203'.

S201': forming a conductive film on the base substrate, and patterning the conductive film to obtain the electrode layer. The electrode layer includes touch electrodes and dummy electrodes insulated from the touch electrodes.

S202': depositing an insulating layer on the electrode layer, and patterning the insulating layer to form first vias and second vias extending through the insulating layer.

S203': forming a metal film on the insulating layer, and patterning the metal film to obtain a metal layer. The metal layer includes touch leads and an electrostatic conductive structure insulated from the touch leads, the electrostatic conductive structure being grounded. The touch electrodes are connected to the touch leads through the first vias, and the dummy electrodes are connected to the electrostatic conductive structure through the second vias.

In the manufacturing method of the touch substrate according to the embodiment of the present disclosure, when the metal layer is manufactured, the touch leads and the electrostatic conductive structure may be formed at the same time, and the electrical connection between the touch leads and the touch electrodes, and the electrical connection between the electrostatic conductive structure and the dummy electrodes may be achieved by utilizing the vias, so that the problem of local electrostatic damage of the display panel caused by the electrostatic charges accumulated on the dummy electrode may be solved, without increasing acts of the process.

Reference may be made to the description of the electrostatic conductive structure in the above embodiments of the touch substrate, which will not be repeated herein.

When the mutual-capacitance touch substrate is manufactured and when the driving electrodes and the sensing electrodes are located on the same electrode layer, generally the driving electrodes include a plurality of driving sub-electrodes, and the adjacent driving sub-electrodes are electrically connected to each other by bridging; or the sensing electrodes include a plurality of sensing sub-electrodes, and the adjacent sensing sub-electrodes are electrically connected to each other by bridging.

In an exemplary embodiment, the bridging between adjacent driving sub-electrodes or adjacent inductive sub-electrodes is achieved by bridging portions. In view of this, the manufacturing method of the array substrate further includes: manufacturing a plurality of bridging portions, wherein the bridging portions are simultaneously arranged with and insulated from the metal layer. At this time, in act S202 or S202', the insulating layer is patterned, and the resulting vias include third vias in addition to the first vias and the second vias. The adjacent driving sub-electrodes are connected to both ends of the bridging portions through the third vias, or adjacent inductive sub-electrodes are connected to both ends of the bridging portions through the third vias.

In an exemplary embodiment, manufacturing a plurality of bridging portions may include forming a metal film on a base substrate and patterning the metal film to obtain a metal layer and a plurality of bridging portions. Since the bridging portion and the metal layer may be manufactured at the same time, it is beneficial to saving acts of the process and reducing the production cost.

In an exemplary embodiment, manufacturing a plurality of bridging portions may include forming a plurality of bridging portions on a base substrate on which the metal layer has been manufactured, wherein the material of the bridging portions is the same as that of the electrode layer. Since the bridging portion is made of the same material as the electrode layer, it is beneficial to reducing the moire effect of the display apparatus.

Embodiments of the present disclosure may be applied to achieve the following beneficial effects.

In the touch substrate and manufacturing method thereof, touch display panel and touch display apparatus according to the embodiments of the present disclosure, the dummy electrodes are electrically connected to the grounded electrostatic conductive structure, so that electrostatic charges on the dummy electrodes may be discharged through the electrostatic conductive structure, thereby effectively preventing the electrostatic charges from accumulating on the dummy electrodes, and further avoiding the problem of local electrostatic damage of the display panel caused by the electrostatic charges accumulated on the dummy electrodes. As the touch leads and the electrostatic conductive structure are formed on the same layer, the thickness of the touch substrate may be reduced, and the problem of electrostatic charges accumulation on the dummy electrodes may be solved without increasing acts of the process.

Those skilled in the art will understand that various operations, methods, acts in the process, measures and schemes may be alternated, changed, combined or deleted. Further, other acts, measures and schemes in various operations, methods and processes already discussed in the present disclosure may also be alternated, changed, rearranged, divided, combined or deleted. Further, acts, measures and schemes in the prior arts having the same functions with those in various operations, methods and processes disclosed in the present disclosure may also be alternated, changed, rearranged, divided, combined or deleted.

In the description of the present disclosure, it should be understood that azimuth or positional relationships indicated by terms "middle", "upper", "lower", "front", "rear", "left", "right", "vertical", "horizontal", "top", "bottom", "inside", "outside" and the like is based on the azimuth or positional relationship shown in the drawings, which is only for ease of description of the present invention and simplification of the description, rather than indicating or implying that the apparatus or element referred to must have a specific orientation, or must be constructed and operated in a particular orientation, and therefore cannot be construed as limiting the present disclosure.

The terms "first" and "second" are used for description purposes only, and cannot be interpreted as indicating or implying relative importance or implicitly indicating the quantity of technical features referred to. Thus, the features defined with "first" and "second" may include one or more of the features explicitly or implicitly. In the description of the present invention, unless otherwise specified, "a plurality of" means two or more.

In the description of the present disclosure, unless otherwise clearly specified and defined, the terms "install", "connect", "couple" should be broadly interpreted, for example, it may be connected fixedly or may be connected detachably, or integrated; it may be directly connected, or may be indirectly connected through an intermediary, or may be an internal connection between two elements. Those of ordinary skilled in the art will understand the specific meanings of the above terms in the present invention according to specific situations.

The specific features, structures, materials, or characteristics described in the description may be combined in any one or more embodiments or examples in a proper way.

It should be understood that although various acts in the flowcharts of the drawings is shown in the order as indicated by arrows, these acts are not necessarily executed sequentially in the order as indicated by the arrows. Unless explicitly stated herein, the execution of these acts is not strictly limited in order, and may be executed in other orders. Furthermore, at least a part of the acts in the flowcharts of the drawings may include a plurality of sub-acts or stages, which may not necessarily be completed at the same time, but may be executed at different time, and the execution order may not necessarily be carried out sequentially, but may be executed sequentially or alternately with other acts or at least a part of sub-acts or stages of other acts.

The above is only part of the implementation of the present disclosure, and it should be noted that for those of ordinary skill in the art, without departing from the principles of the present disclosure, several improvements and modifications can be made, and these improvements and modifications should also be regarded as covered by the protection scope of the present disclosure.

What is claimed is:

1. A touch substrate comprising a base substrate, a metal layer and an electrode layer on the base substrate, and an insulating layer between the metal layer and the electrode layer;
    wherein the metal layer comprises touch leads and an electrostatic conductive structure insulated from the touch leads, the electrostatic conductive structure being grounded;
    the electrode layer comprises touch electrodes and dummy electrodes insulated from the touch electrodes, wherein the touch electrodes are electrically connected to the touch leads, and the dummy electrodes are electrically connected to the electrostatic conductive structure, and
    wherein the touch leads and the electrostatic conductive structure are formed on a same layer.

2. The touch substrate according to claim 1, wherein the electrostatic conductive structure is a metal mesh.

3. The touch substrate according to claim 2, wherein,
    the metal mesh comprises a plurality of first metal wires extending along a first direction and a plurality of second metal wires extending along a second direction, wherein an angle between the first metal wires and the second metal wires is 70°-80°;
    a distance between any two adjacent first metal wires is 100-300 microns, and a distance between any two adjacent second metal wires is 100-300 microns.

4. The touch substrate according to claim 1, wherein the touch substrate comprises pixel regions and pixel defining regions between the pixel regions;
    the electrostatic conductive structure is a plurality of metal wires in the pixel defining regions.

5. The touch substrate according to claim 1, further comprising: first vias and second vias extending through the insulating layer;
    wherein the touch electrodes are connected to the touch leads through the first vias, and the dummy electrodes are connected to the electrostatic conductive structure through the second vias.

6. The touch substrate according to claim 5, wherein an orthographic projection of the first vias on the base substrate is located on an orthographic projection of corresponding touch leads on the base substrate, and an orthographic projection of the second vias on the base substrate is located on an orthographic projection of corresponding electrostatic conductive structure on the base substrate.

7. The touch substrate according to claim 5, wherein,
    the touch leads comprise first touch leads and second touch leads;
    the touch electrodes comprise driving electrodes extending along a third direction and sensing electrodes extending along a fourth direction, wherein the driving electrodes are electrically connected to the first touch leads and the sensing electrodes are electrically connected to the second touch leads;

the dummy electrodes are located in areas surrounded by adjacent driving electrodes and adjacent sensing electrodes.

8. The touch substrate according to claim 7, wherein the third direction intersects with the first direction and the second direction respectively, and the fourth direction intersects with the first direction, the second direction and the third direction respectively.

9. The touch substrate according to claim 7, further comprising:

a plurality of bridging portions and third vias extending through the insulating layer;

wherein, the driving electrodes comprise a plurality of driving sub-electrodes, and adjacent driving sub-electrodes are connected to both ends of the bridging portions through the third vias, enabling the adjacent driving sub-electrodes to electrically connect to each other; or the sensing electrodes comprise a plurality of sensing sub-electrodes, and adjacent sensing sub-electrodes are connected to both ends of the bridging portions through the third vias respectively, enabling the adjacent sensing sub-electrodes to electrically connect to each other.

10. The touch substrate according to claim 9, wherein, the plurality of bridging portions are arranged in the same layer as the metal layer and insulated from the metal layer;

material of the bridging portions is the same as that of the electrode layer, or material of the bridging portions is the same as that of the metal layer.

11. The touch substrate according to claim 1, further comprising:

a protective layer located on one side, away from the base substrate, of the metal layer and the electrode layer.

12. The touch substrate according to claim 1, wherein the electrostatic conductive structure is made of a same material as the touch leads.

13. The touch substrate according to claim 1, wherein material of the electrode layer comprises at least one of indium tin oxide and zinc aluminum oxide.

14. A touch display panel comprising the touch substrate according to claim 1.

15. The touch display panel according to claim 14, further comprising:

a cover plate and a display component, wherein the cover plate is reused as the base substrate of the touch substrate, and the metal layer and the electrode layer are located on one side, close to the display component, of the cover plate; or a color film substrate comprising a first base substrate and color-resist units on one surface of the first base substrate, wherein the first base substrate is reused as the base substrate of the touch substrate; or an array substrate comprising a second base substrate and thin film transistors on one surface of the second base substrate, wherein the second base substrate is reused as the base substrate of the touch substrate, and the metal layer and the electrode layer are located on one side, away from the second base substrate, of the thin film transistors.

16. A touch display apparatus comprising the touch display panel according to claim 14.

17. A manufacturing method of a touch substrate, comprising:

providing a base substrate;

manufacturing a metal layer, an insulating layer and an electrode layer on the base substrate;

wherein the metal layer comprises touch leads and an electrostatic conductive structure insulated from the touch leads, the electrostatic conductive structure being grounded;

the electrode layer comprises touch electrodes and dummy electrodes insulated from the touch electrodes, wherein the touch electrodes are electrically connected to the touch leads; the dummy electrodes are electrically connected to the electrostatic conductive structure, and wherein the touch leads and the electrostatic conductive structure are formed on a same layer.

18. The manufacturing method according to claim 17, wherein the act of manufacturing the metal layer, the insulating layer and the electrode layer on the base substrate comprises:

forming a metal film on the base substrate, and patterning the metal film to obtain the metal layer;

depositing an insulating layer on the metal layer, and patterning the insulating layer to form first vias and second vias extending through the insulating layer;

forming a conductive film on the insulating layer, and patterning the conductive film to obtain the electrode layer;

wherein, the touch electrodes are connected to the touch leads through the first vias, and the dummy electrodes are connected to the electrostatic conductive structure through the second vias.

19. The manufacturing method according to claim 17, wherein the act of manufacturing the metal layer, the insulating layer and the electrode layer on the base substrate comprises:

forming a conductive film on the base substrate, and patterning the conductive film to obtain the electrode layer;

depositing an insulating layer on the electrode layer, and patterning the insulating layer to form first vias and second vias extending through the insulating layer;

forming a metal film on the insulating layer, and patterning the metal film to obtain the metal layer;

wherein the touch electrodes are connected to the touch leads through the first vias, and the dummy electrodes are connected to the electrostatic conductive structure through the second vias.

20. The manufacturing method according to claim 17, further comprising:

manufacturing a protective layer on one side, away from the base substrate, of the metal layer and the electrode layer.

* * * * *